United States Patent [19]

Pieprzak et al.

[11] Patent Number: 4,922,465
[45] Date of Patent: May 1, 1990

[54] INTERPOLATION OF SEVERELY ALIASED EVENTS

[75] Inventors: Andrew W. Pieprzak; James W. McClean, both of Houston, Tex.

[73] Assignee: GECO A/S, Norway

[21] Appl. No.: 358,426

[22] Filed: May 30, 1989

[51] Int. Cl.[5] .............................................. G01V 1/36
[52] U.S. Cl. ........................................ 367/38; 367/59; 364/421
[58] Field of Search .................... 364/421; 367/38, 59, 367/53, 73

[56] References Cited

U.S. PATENT DOCUMENTS

| | | | |
|---|---|---|---|
| 4,594,693 | 6/1986 | Pann et al. | 367/43 |
| 4,829,487 | 5/1989 | Malloy | 367/40 |

OTHER PUBLICATIONS

Bardan V., 1987, Trace Interpolation in Seismic Data Processing: Geophysical Prospecting 35, 343–348.
Larner, K. et al., 1981, Trace Interpolation and the Design of Seismic Surveys: Geophysics 46, 407.
Sicking, C. J. et al., 1981, Interpolation and Sampling: SEG–Dallas Expanded Abstracts: 123–124.
King, G. A. et al., 1984, The Role of Interpolation in Seismic Resolution: SEG–Atlanta, Expanded Abstracts; 766–767.

Primary Examiner—Ian J. Lobo
Attorney, Agent, or Firm—Richards, Medlock & Andrews

[57] ABSTRACT

Methods for interpolation of severely aliased events in which composite wavelets of a section of seismic data traces are separated by wave field decomposition into their component wavelets. The spatially aliased component wavelets are identified to form a first class of wavelets. A second class of wavelets is comprised of non-aliased component wavelets. The wavelets in the second class or non-aliased component wavelets are interpolated in accordance with known techniques, such for example, as sinc interpolation whereas the spatially aliased component wavelets are interpolated in accordance with dip guided interpolation to provide the same number of traces as those comprising the second class of wavelets. The interpolated first and second class of wavelets are summed to provide a section of seismic data substantially free of spatial aliasing.

12 Claims, 7 Drawing Sheets

$$T_1(\omega) = S_1(\omega) e^{+i\omega t_1} + S_2(\omega) e^{-i\omega t_2} + R_1(\omega)$$

$$T_2(\omega) = S_1(\omega) \qquad\qquad + S_2(\omega) \qquad\qquad + R_2(\omega)$$

$$T_3(\omega) = S_1(\omega) e^{-i\omega t_1} + S_2(\omega) e^{+i\omega t_2} + R_3(\omega)$$

48

INTERPOLATION OF SEVERELY ALIASED EVENTS

BACKGROUND OF THE INVENTION

1. Field of the Invention

This invention relates to methods for treating seismic data in a manner to account for severely alias events. The methods are directed generally to interpolation techniques which in the presence of aliased events enable the production of high resolution data in preparation of the data for multi-trace processing and more specifically for migration.

2. Description of the Prior Art

The proper choice of spatial sampling interval is of significant importance in the design of seismic data acquisition techniques. Too large a sampling interval has a negative effect upon multi-trace processing of seismic data, especially migration since the sampling theorem is violated. Poor results are obtained when the spatial sampling interval is too large. On the other hand, too small a sampling interval in the field adds significantly to the cost of seismic data acquisition particularly in the 3-dimensional (3-D) case. Economic benefits can be obtained by interpolating aliased seismic data. This reduces the cost of data acquisition and prepares the data for improved multi-trace processing.

The effect of interpolating spatially aliased seismic data is dramatically illustrated in FIGS. 4 and 5 of paper entitled Trace Interpolation in Seismic Data Processing by V. Bardon appearing in Geophysical Prospecting 35 pages 343-358 published in 1987. It is obvious from an examination of those figures that migration of spatially aliased data produces useless results.

A number of interpolation techniques are available, among them being sinc interpolation. However, these techniques are inadequate in the processing of spatially aliased events to provide data suitable for migration and other multi-trace processes. Other interpolation techniques have been proposed among them being a technique which searches mult-trace data in the X-t space for the locally most coherent dip and interpolates amplitude along the dip direction. However, this technique, since it only takes in account the most coherent dip, fails to provide the resolution necessary for an accurate interpretation of the migrated data.

The present invention produces high resolution sections free of aliasing by following a two step procedure. The first step involves a data adaptive procedure for picking dips in small overlapping spatio-temporal gates. The second step utilizes the dips to perform a localized wave field decomposition of the dipping events. The aliased events are interpolated along their true dip directions onto the interpolated trace positions using time shifting operations. By separating the data into the aliased and non-aliased segments the non-aliased or un-aliased events may be processed with the conventional sinc interpolation and then combined with the results of the two step procedure of the present invention.

SUMMARY OF THE INVENTION

The present invention provides a improved technique for the interpolation of severely aliased events in which composite wavelets of a section of seismic data traces are separated by wave field decomposition into their component wavelets. The spatially aliased component wavelets are identified to form a first class of wavelets. The second class of wavelets is comprised of non-aliased component wavelets. The wavelets in the second class or non-aliased component wavelets are interpolated in accordance with known techniques such for example as sinc interpolation whereas the spatially aliased component wavelets are interpolated in accordance with a dip guided interpolation to provide the same number of traces as those comprising the second class of wavelets. The interpolated first and second class of wavelets are summed to provide a section of seismic data substantially free of spatial aliasing.

In carrying out the invention the first step is to examine an input seismic section and to pick the dips of the wavelets across the section. This dip picking may be automatic.

For each of the spatio-temporal gates, as a result of the wave field decomposition, there is produced a number of sets of data equal in number to the number of different dips present in the seismic data being decomposed plus a set of residual data. Each set of dip data is examined to determine whether or not the data meets the conditions of the Nyquist criterion to determine if aliasing exists. The spatially aliased data are time shifted to reduce the dip to zero thus eliminating the aliasing condition and the weighted average of the time shifted data is derived to comprise one portion of an interpolated trace.

BRIEF DISCUSSION OF DRAWINGS

The foregoing advantages of the invention will become more apparent as the following detailed description is read in conjunction with the accompanying drawings wherein like references characters in like parts in all views and wherein.

DESCRIPTION OF PREFERRED EMBODIMENTS

Figure 1:
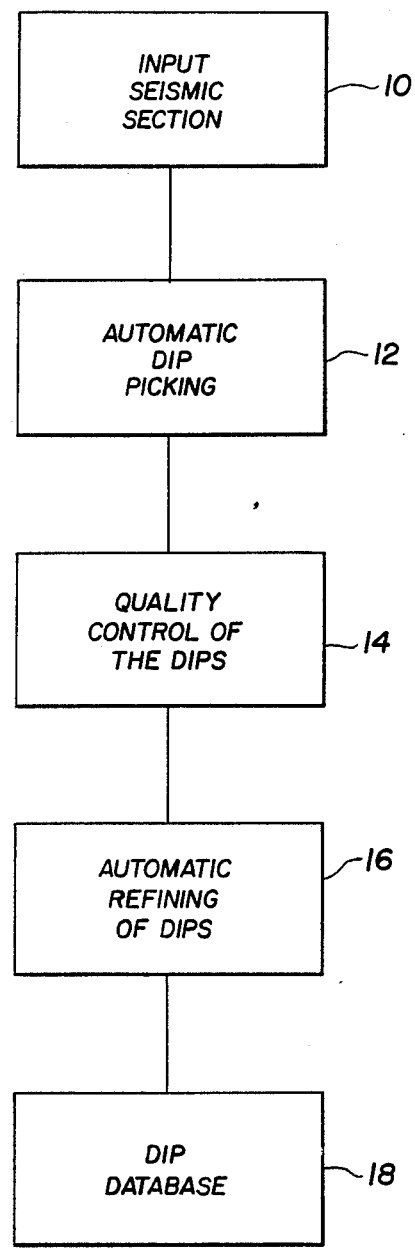
FIG. 1 is a processing flow diagram depicting the steps involved in generating a dip data base.

The interpolation method of the present invention is a two stage process. The first of which is the establishment of a dip data base the procedure for which is illustrated in FIG. 1.

Seismic section 10 as applied to an automatic dip picking program in block 12. Automatic dip picking programs are well known in the art and become a necessity especially for 3-D surveys where large amounts of data are encountered. While the dip picking programs are for the most part effective, errors do occur and dictate a review of the picked data for quality control of the picked dips. This occurs at step 14 where a fast response interactive work station (not shown) provides a manual editing function. A suitable work station is the IBM 5080 Graphics Work Station. PHIGS software enables the loading of the dipdata for processing. The manual corrections and or additions to the dip picks are processed by an automatic refining program, the writing of which is well within the skill of the art, which adapts the picks to the data utilizing a multi-channel cross correlation technique. The automatic refining of the dips occurs in Step 16 resulting in the dip data base of Step 18.

Figure 2:
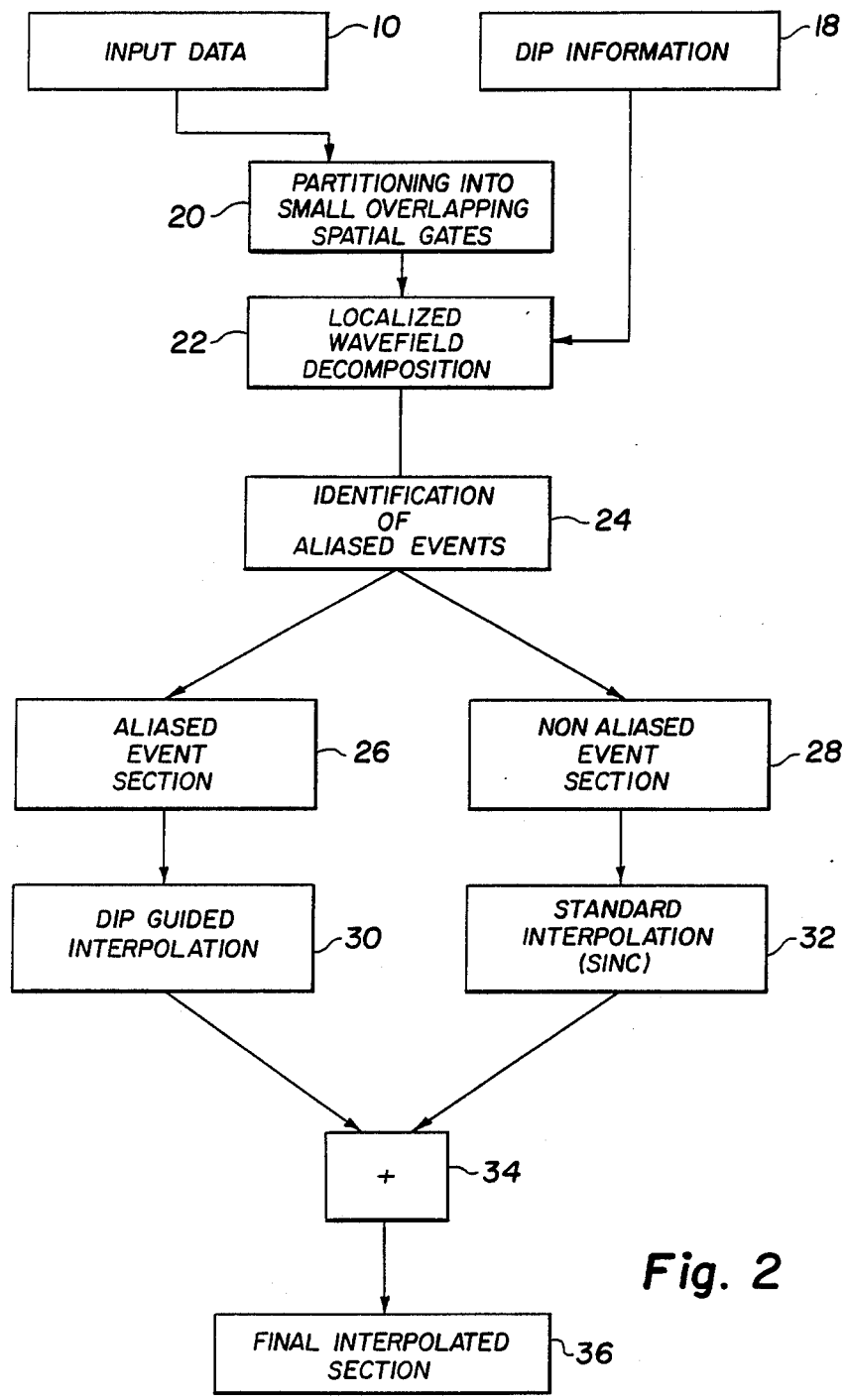
FIG. 2 is a processing flow diagram depicting the steps involved in utilizing the dip information and seismic data in the practice of the present invention.

The second stage of the process is illustrated by the flow diagram of FIG. 2. The input data 20 and the dip information or dip database 18 are accessed by the interpolation software to perform localized wave field decomposition and the actual trace interpolation. The input section or data 10 is partitioned at step 20 into small overlapping spatial gates and applied together with the dip information 18 for localized wavefield decomposition in step 22. In the decomposition step, each spatial time gate is treated as a 2-D composite wavelet, comprised of an additive mixture of 2-D signal wavelets defined as the energy with given linear time stepout over the input traces and of uncorrelated events classified as residuals.

Signals or data classified as aliased in step 24 are utilized to form an aliased event section in step 26. The aliased signals or events are subtracted from the input data to form a non-aliased event section in step 28. The aliased event section and the non-aliased event section are next interpolated respectively at steps 30 and 32. The data of the aliased event section is interpolated utilizing dip guided interpolation and standard interpolation, such for example as sinc interpolation, is applied to the non-aliased data of step 28. The interpolated data are then combined at step 34 to form the final interpolated section in step 36.

Figure 3:
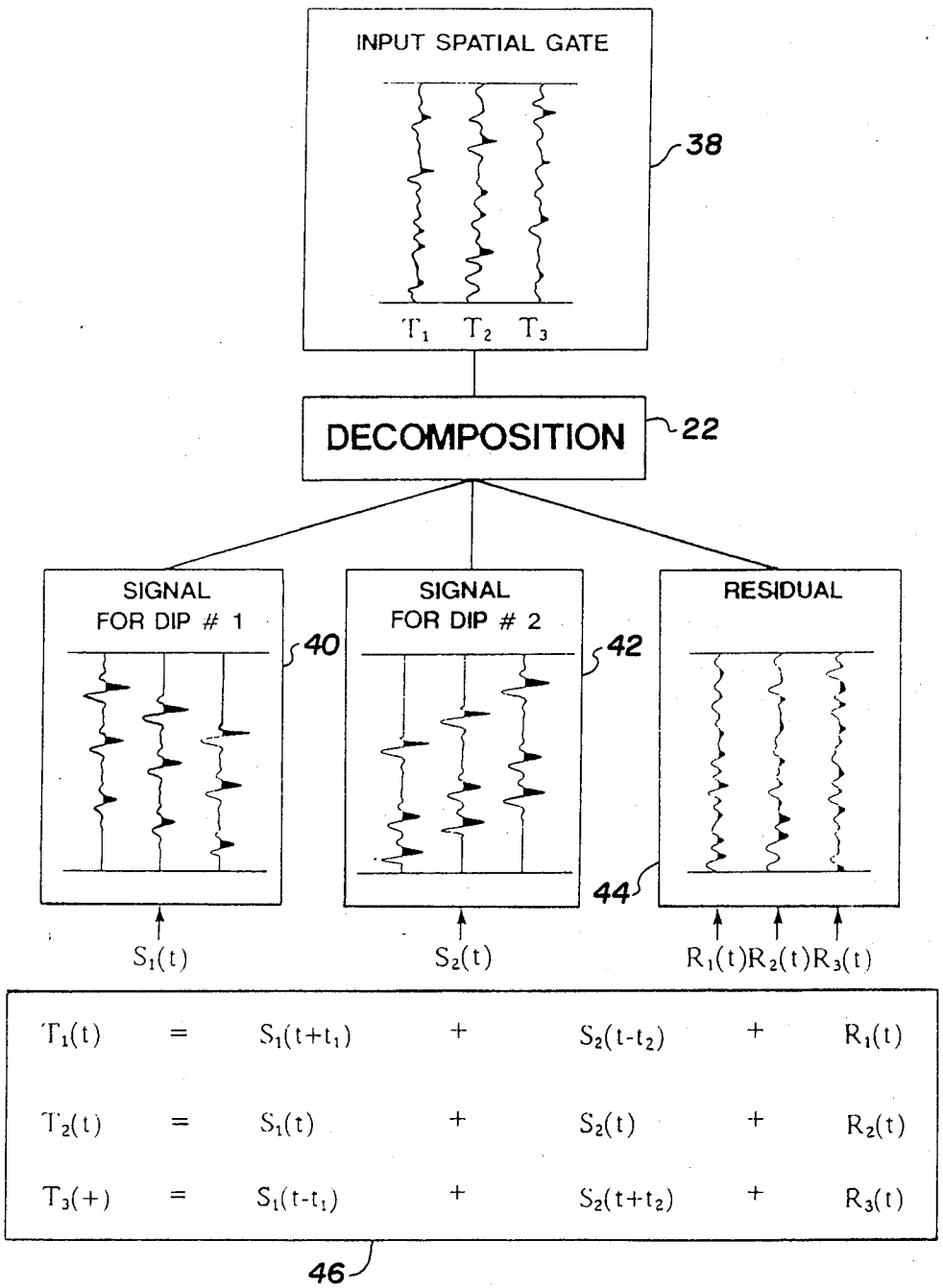
FIG. 3 depicts the data in an input spatial gate the effect of decomposition in the presence of two dips and a set of simultaneous equations in the time domain.

In preparation for localized wavefield decomposition the input section is partitioned into small overlapping spatial gates of typically three to five traces and 300 to 500 milliseconds in length. An example of decomposition of a three-trace operation is illustrated in FIG. 3 where three traces $T_1$, $T_2$ and $T_3$ are shown in block 38. The localized wave field decomposition occurs at block 22 resulting in a set of data for each identified coherent dip and a set of data identified as residual. In the example being described two coherent dips (dip #1 and dip #2) are identified and these data are respectively illustrated in blocks 40 and 42. The residual data is illustrated in block 44.

Figures 4, 5:
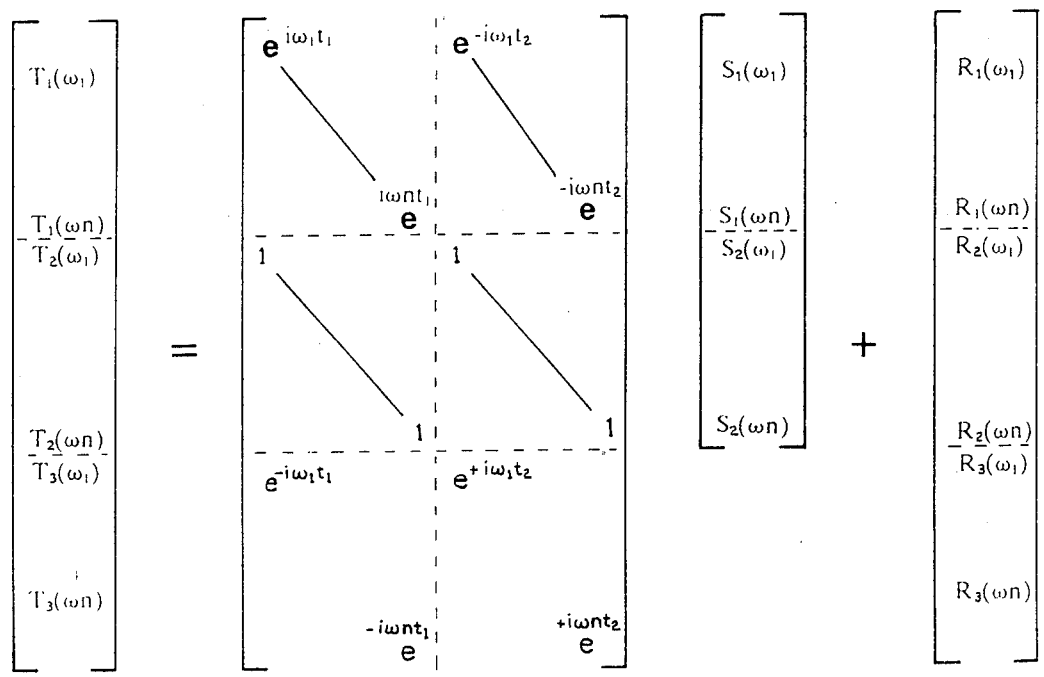
FIG. 4 illustrates the time domain equations of FIG. 3 in the frequency domain.
FIG. 5 illustrates the solution of the equations of FIG. 4 in matrix form.

The localized wave decomposition program in block 22, in carrying out the task of separating events of a given seismic section into aliased and non-aliased parts or sections, employs a set of simultaneous equations, one equation for each of the traces $T_1$, $T_2$ and $T_3$ as illustrated in block 46. These equations are written in the time domain. However, the solution of the equations is most conveniently carried out in the frequency domain and these equations in the frequency domain are illustrated in block 48 of FIG. 4. In carrying out the solution the equations are written in matrix form as shown in FIG. 5, one matrix for each of the input spatial gates. As shown the equations in the frequency domain, block 48, are reduced to a set of simultaneous equations with the unknowns being the complex spectra of the composite signal wavelets and as aforesaid these simultaneous equations are solved utilizing conventional matrix solution techniques. The elements of the matrix are initialized from the dip data base information. It is clear in this approach that only the dip values within the spatial time gates are required, with the time distribution of the dipping events being encoded implicitly in their complex structure.

Because of the small spatial gates, time stepouts of the events can be well approximated by linear functions. A complex version of the conjugate gradient least squares solver formulated by J. Clearbout is described in his paper entitled Decomposition by Conjugate Gradients appearing in S.E.P. 44, 167-174. The Clearbout technique enables one to gain computational speed in solving the large sets of simultaneous equations through the least squares minimization of the residual signal. Additionally, the built-in minimum length solution provides a numerical stability for cases where event dips are close enough to cause the shift matrix of complex exponentials to become nearly singular.

The decomposition step is continued for successive spatial gates along the length of the traces $T_1$, $T_2$ and $T_3$ with each gate overlapping a preceding gate by approximately 20 percent. When the last spatial gate appears at the end of the traces the procedure begins again with the new family of spatial gates being applied to traces $T_2$, $T_3$ and $T_4$. The trace of $T_4$ is not illustrated. In other words, for each new operation begun on the traces the first trace is dropped and the next succeeding trace added until the entire portion of the seismic section of interest has been decomposed.

The segments of the decomposed data, such for example, as shown in blocks 40 and 42 are classified for the presence of spatial aliasing. In this regard spatial aliasing is identified by employing the Nyquist criterion with respect to the highest frequency of interest. Explorationists have excellent information as to the highest frequency of receive signal that gives useful results in any general area of exploration. For example, in certain areas in the Gulf of Mexico the highest frequency of interest is 60 hertz which has a period of 16.67 milliseconds. In order to safisfy the Nyquist sampling criterion waveforms on adjacent traces, which result from the same reflecting interface, must have a time shift of less than one-half the period of the highest frequency of interest. In the present example any waveforms in adjacent traces resulting from the same interface reflecting interface must have a time shift of 8.33 milliseconds or less to satisfy the Nyguist sampling criterion. Any adjacent waveforms which are separated by more than 8.33 milliseconds are considered to be spatially aliased. Accordingly, in classification of the decomposed data as illustrated in blocks 40 and 42 the dip database information is used to determine the difference in time occurrence of wavelets on adjacent traces and should the time occurrence exceed 8.33 milliseconds the data is considered spatially aliased.

Assuming that the data in block 40 is spatially aliased dip guided interpolation is applied by first time shifting the waveforms along each dip so that they are aligned horizontally. With a horizontal alignment the time occurrence difference between the waveforms is zero and spatial aliasing is eliminated. The traces are then averaged using a weighted average technique, one of any number of well known types including that in which the weight ascribed to each waveform is one. The weighted average of the traces is thereafter moved along the known dip line to provide an additional trace, for example, between the traces $T_1$ and $T_2$. Thereafter a interpolated trace may be formulated and inserted between traces T$_2$ and T$_3$ by time shifting and taking the weighted average of wave forms present in traces T$_2$, T$_3$ and T$_4$. Should the data in block 42 be determined to be non-aliased, sinc interpolation will be utilized and the resultant data added to the interpolated data from block 40. Finally the residual data, always non-aliased, will be treated by sinc interpolation and also added to the aforementioned sum to produce one segment of an interpolated trace. The procedure then continues for successive spatial gates and traces until interpolation is completed for that portion of the seismic section of interest.

Figure 6:
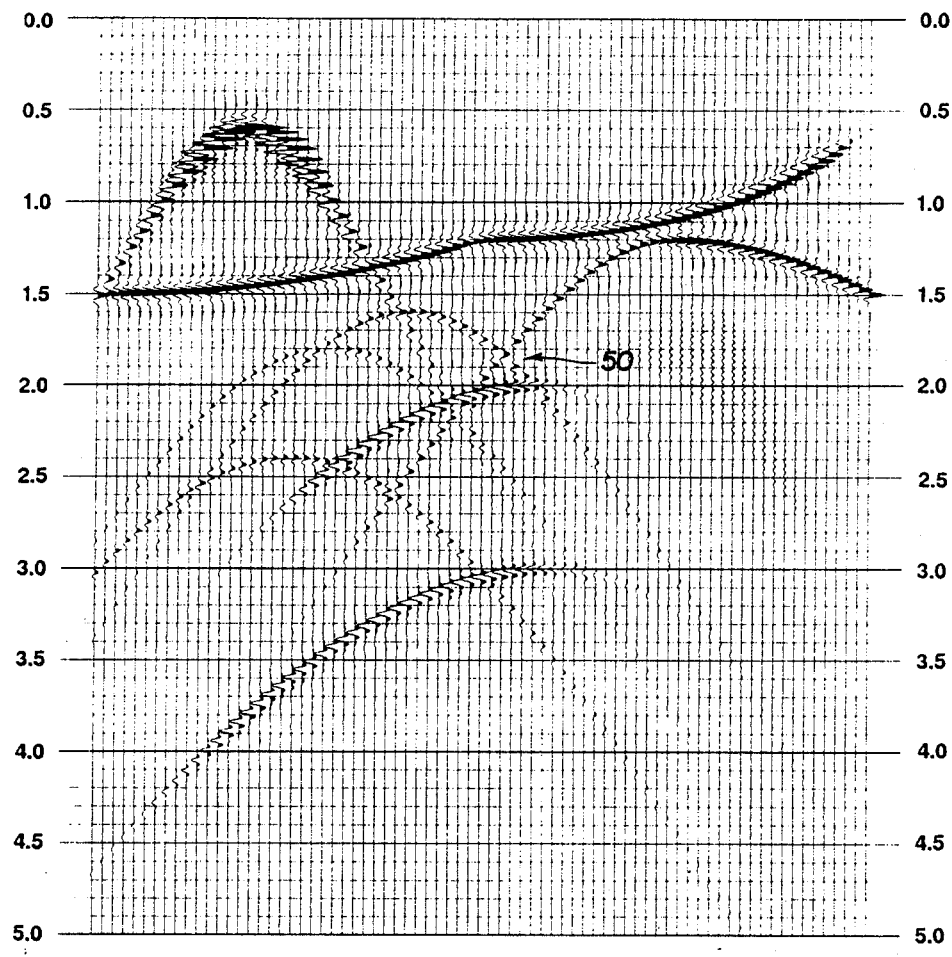
FIG. 6 illustrates a synthetic data set with severely aliased events.
Figure 7:
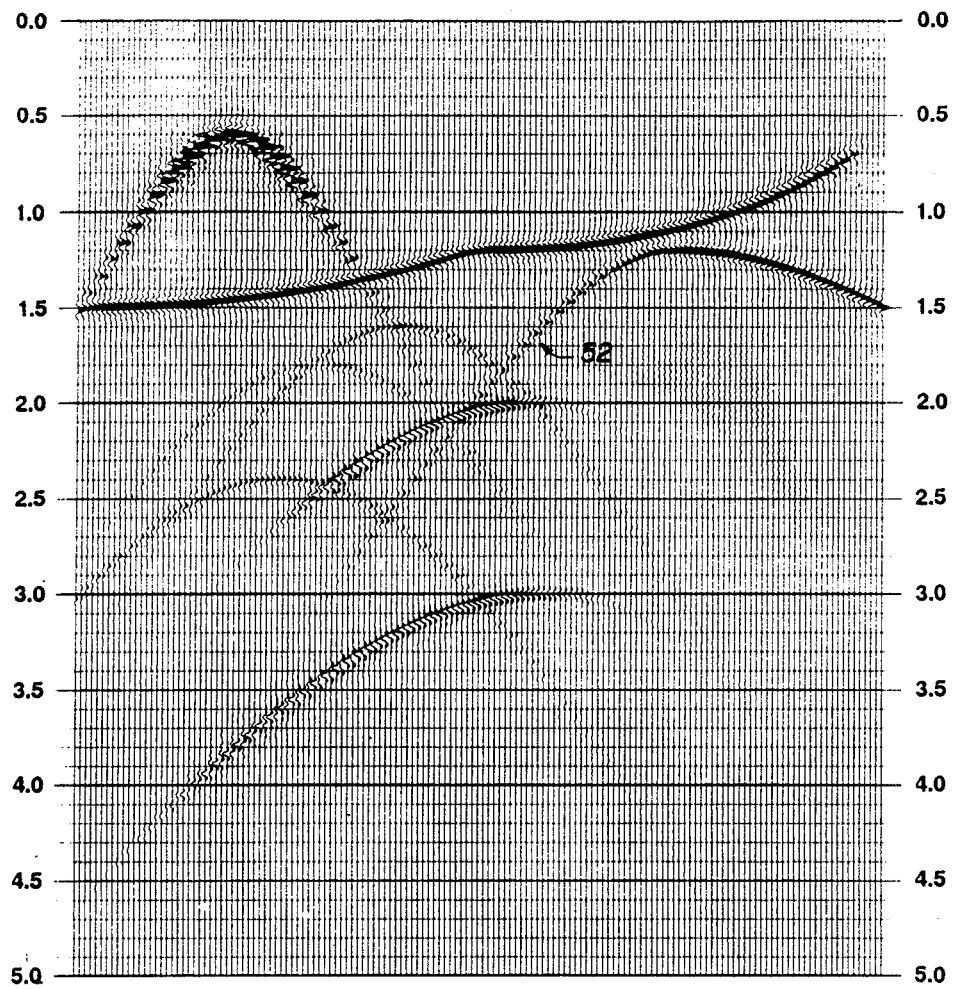
FIG. 7 illustrates the data of FIG. 6 after interpolation utilizing the sinc interpolation method.
Figure 8:
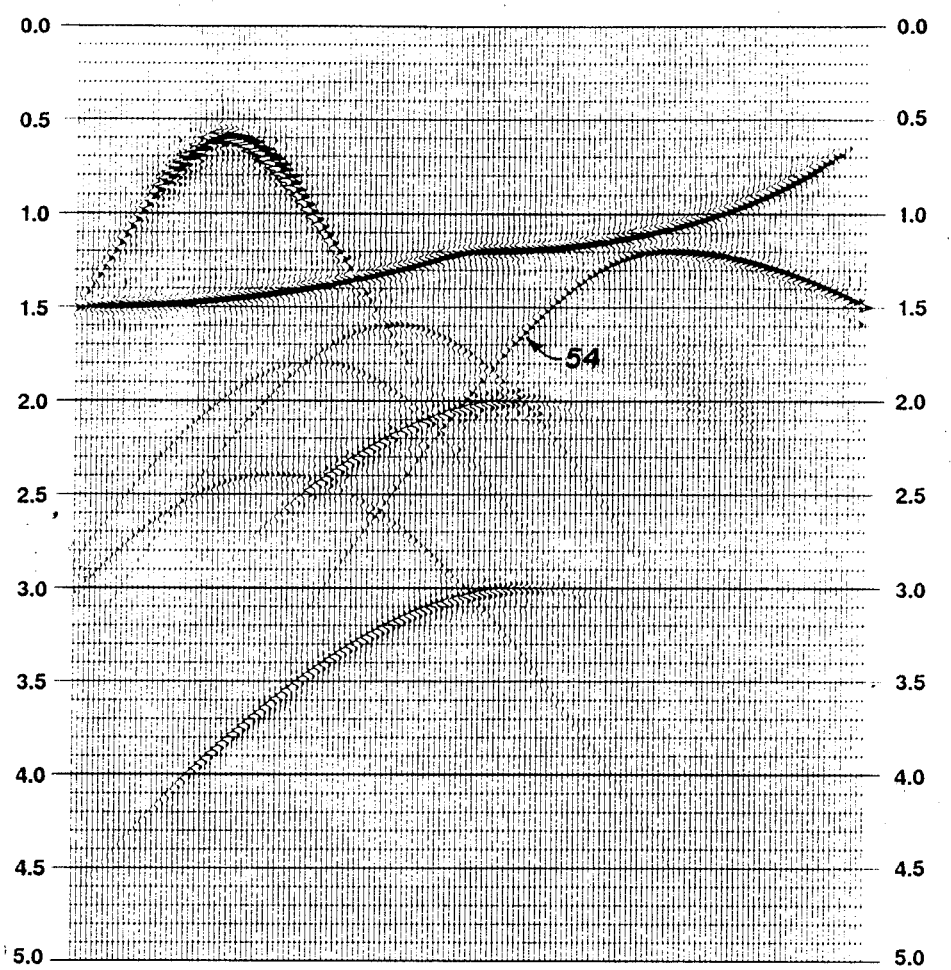
FIG. 8 illustrates the data of FIG. 6 following interpolation utilizing the algorithm of the present invention.

References now made to FIGS. 6, 7 and 8 to demonstrate the effectiveness of the present invention in the interpolation of severely aliased seismic data. FIG. 6 is a synthetic case containing a number of steeply dipping events intersecting with different dips and amplitudes, for example, at the center 50 of the synthetic secton.

FIG. 7 illustrates the effect of attempting to interpolate the data of FIG. 6 utilizing sinc interpolation. Note that the traces of the section FIG. 7 have now effectively doubled in number and because of the presence of spatial aliasing the event wavelets appear to follow different smaller dip directions and are characterized by the presence of triplets and locations indicated generally by the arrow 52. The presence of the triplets gives rise to serious problems when efforts are made to migrate the data such that the resulting migration may present a false indication of subsurface stratigraphy and may indeed very well be uninterpretable.

On the other hand, the section of FIG. 8 has been interpolated utilizing the method of the present invention and as can be seen by examining the traces generally indicated by the arrow 54 the data is absent the triplets, is absent aliasing and thus is in condition for migration.

In view of the foregoing it is obvious that cases of severe spatial aliasing can be treated by the data adaptive dip guided method of the present invention. There has also been demonstrated that the local wave field decomposition in the frequency domain is well suited to true amplitude interpolation of crossing events wherein only dip information is required and the applicability of a conjugate gradient lease square solver makes the procedure computationally fast.

The method illustrated by the flow diagram of FIG. 2 is implimented by way of a properly programed VP-1100 Fujitsu Vector Processor a programming of which, in view of the above description is within the skill of the art.

It will be understood that the foregoing detailed description is provided by way of example only, that many changes and modifications can be made thereto without departing from the spirit or scope of the invention as defined by the appended claims.

What is claimed is:

1. A method of interpolating spatially aliased seismic data traces comprising the steps of:
    separating by wave field decomposition composite wavelets of a section of seismic data traces into their component wavelets,
    identifying spatially aliased component wavelets to form a first class of wavelets,
    identifying non-aliased component wavelets to form a second class of wavelets,
    interpolating the wavelets in said second class with conventional interpolation techniques,
    interpolating the wavelets in said first class in accordance with dip guided interpolation to provide the same number of traces as those comprising said second class of wavelets, and
    summing said interpolated first and second classes of wavelets to provide a section of seismic data substantially free of spatial aliasing.

2. The method of claim 1 in which dip is determined for wavelets in adjacent traces to form a dip data base to be utilized in the step of wave field composition.

3. The method of claim 2 in which a finite window is established encompassing a minimum of three adjacent seismic data traces thereby selecting the wavelets for decomposition.

4. The method of claim 3 in which the length of each said finite window is in the range of from 300 to 500 milliseconds.

5. The method of claim 3 in which said window is stepped along said traces, each time identifying data for decomposition.

6. The method of claim 5 in which each window overlaps a succeeding window by approximately 20 percent.

7. The method of claim 5 in which upon said window encompassing terminal data in said traces, said steps are repeated with a new set of traces in which the first trace of the previous set is dropped and a next succeeding trace is added.

8. The method of claim 2 in which wavefield decomposition results in a number of sets of data equal in number to the number of different dips present in the seismic data being decomposed plus a set of residual data.

9. The method of claim 8 in which aliased sets of data are interpolated in accordance with dip guided interpolation, non-aliased data are interpolated in accordance with sinc interpolation, residual data are interpolated in accordance with sinc interpolation and the results of interpolation are summed to form one segment of an interpolated trace.

10. The method of claim 2 in which wavefield decomposition is implemented in accordance with the equations $$T_1(\omega) = S_1(\omega)e^{+i\omega t1} + S_2(\omega)e^{-i\omega t2} + R_1(\omega)$$

$$T_2(\omega) = S_1(\omega) + S_2(\omega) + R_2(\omega)$$

$$T_3(\omega) = S_1(\omega)e^{-i\omega t1} + S_2(\omega)e^{+i\omega t2} + R_2(\omega)$$

the solution of which is carried out in accordance with the matrices $$\begin{bmatrix} T_1(\omega_1) \\ \vdots \\ T_1(\omega n) \\ \hline T_2(\omega_1) \\ \vdots \\ T_2(\omega n) \\ \hline T_3(\omega_1) \\ \vdots \\ T_3(\omega n) \end{bmatrix} =$$

-continued
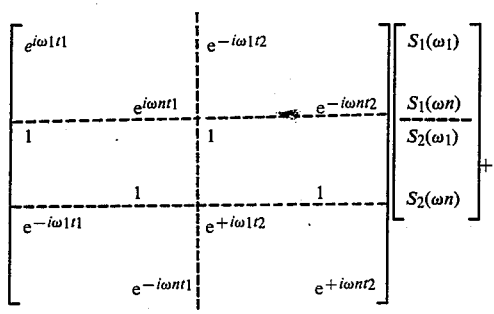
-continued
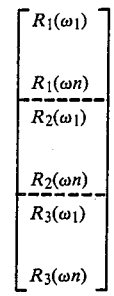
11. The method of claim 1 in which dip guided interpolation comprises the steps of time shifting the wavelets along each coherent dip to produce an alignment with zero dip and obtaining a weighted average of each set of aligned wavelets.
12. The method of claim 9 in which the weight is one.
* * * * *